…

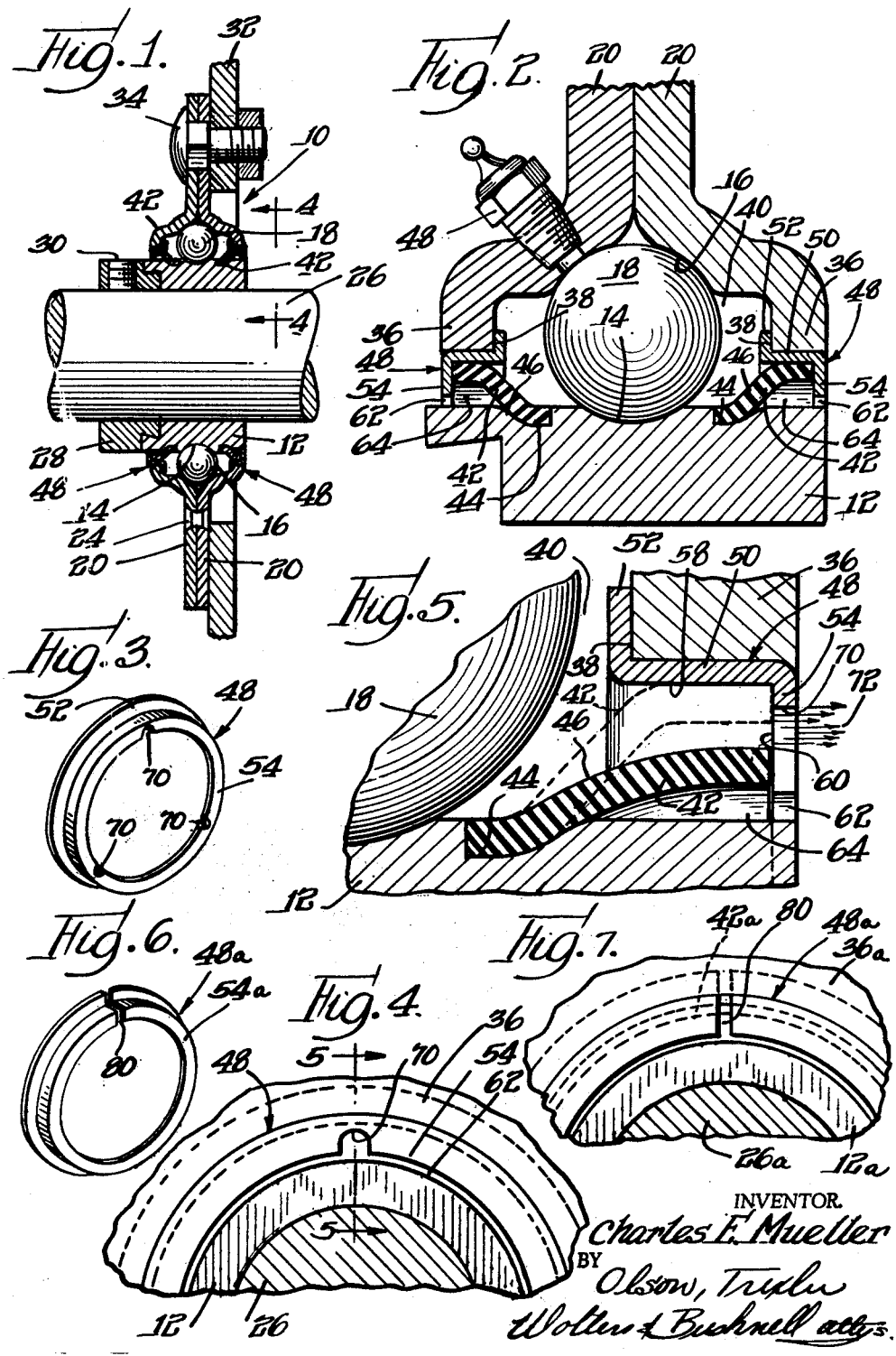

United States Patent Office 3,142,520
Patented July 28, 1964

3,142,520
SEALED BEARING
Charles E. Mueller, Palatine, Ill., assignor, by mesne assignments, to Textron Inc., Providence, R.I., a corporation of Rhode Island
Filed May 4, 1962, Ser. No. 192,447
8 Claims. (Cl. 308—187.2)

The present invention relates to bearings, and particularly to antifriction bearings which must be sealed to protect vital parts from contamination by foreign matter from the external environment. A bearing of the type with which this invention is specifically concerned is disclosed in United States Patent No. 2,823,967, issued February 18, 1958, to R. F. Harrington.

One object of the invention is to provide an improved bearing equipped with economical yet highly efficient and effective bearing sealing means of improved construction which is protected against dislodgment or damage by the injection of excessive volumes of lubricant under pressure into sealed lubricant space within the bearing.

A more specific object is to provide an improved bearing in which a highly efficient and advantageous bearing seal, otherwise subject to dislodgment or damage by excessive fluid under pressure in lubricant space within the bearing, is rendered substantially immune to such dislodgment or damage by means of a very economical yet highly effective shield which is not subject to dislodgment or damage even by the injection of excessive lubricant under pressure into the bearing.

Another object is to provide an improved bearing which is protected under adverse environmental conditions by improved sealing structure that is not subject to dislodgment or damage by stringy material which may be wound into proximity to the bearing by the rotary movement of structure journalled by the bearing.

Another object is to provide an improved bearing of the above character which is inherently well adapted for economical manufacture and capable of operating efficiently and dependably over a long service life even under adverse environmental conditions such as may be encountered in use of the bearing on agricultural machinery.

Other objects and advantages will become apparent from the following description of the exemplary forms of the invention illustrated in the drawings, in which:

FIGURE 1 is an axial sectional view of a bearing constructed in accordance with the invention and installed to journal a shaft on a support plate for the purpose of illustration;

FIG. 2 is a fragmentary axial sectional view of the bearing on an enlarged scale;

FIG. 3 is a perspective view of one of two seal shields used in the bearing of FIGS. 1 and 2;

FIG. 4 is a fragmentary sectional view taken with reference to the line 4—4 of FIG. 1;

FIG. 5 is a fragmentary sectional view on an enlarged scale taken with reference to the line 5—5 of FIG. 4, illustrating in solid lines the position to which a seal moves to relieve excessive fluid pressure within lubricant space in the bearing and illustrating in phantom lines the normal position of the seal;

FIG. 6 is a perspective view similar to FIG. 3 but illustrating a modified form of a bearing seal shield; and FIG. 7 is a view similar to FIG. 4 but illustrating the shield of FIG. 6 installed in place of the shield of FIG. 3.

Much of the structure of the bearing 10 forming the illustrated embodiment of the invention, FIG. 1, is similar to that of the conventional bearing illustrated in the previously mentioned Patent No. 2,823,967.

The bearing 10 comprises an inner race element 12 of annular form defining an inner bearing race 14 which is encircled by an outer bearing race 16 journalled with respect to the inner bearing race by an annular series of rotary antifriction elements 18, in this instance bearing balls, inserted between the inner and outer races to have rolling engagement with both races simultaneously.

The outer race 16 is defined by two formed plates 20 shaped as mirror images of each other from sheet metal and secured firmly together by an annular series of rivets 24.

In this instance, the inner race element 12 receives and supports a rotary shaft 26 and is held against rotation relative to the shaft by a retaining member 28 encircling the shaft 26 in engagement with one end of the element 12 and being clamped to the shaft 26 by a set screw 30. The two outer race elements 20 are secured to a support plate 32 by an annular series of bolts 34.

As shown in FIG. 2, the two outer race elements 20, secured together outwardly of the race 16, are turned away from each other and shaped to define the outer race 16 in a conventional manner. The inner marginal portions of the two elements 20 extend axially in opposite directions beyond the rotary antifriction elements 18, as shown in FIG. 2, and are turned inwardly toward the inner race element 12 to form annular flanges 36 which define annular ledges 38 spaced radially from the inner race element 12.

The space 40 disposed between the inner race element or member 12 and the outer race elements 20 and confined axially between the flanges 36 contains the balls 18 and provides space for lubricant. For convenience, the space for lubricant will be referred to by the number 40.

The lubricant space 40 must be sealed to prevent the escape of lubricant and to prevent the entry from the external environment of materials which would cause damage to the antifriction elements 18 and the coacting races 14, 16.

Highly efficient and effective sealing of the lubricant space 40 is effected by two flexible annular seals 42 which are supported nonrotatably on the inner race member 12 on opposite sides of the series of balls 18 to form sliding seals with the two inwardly turned flanges 36 of the outer race elements 20. These seals 42 are of the same character as those used in the previously mentioned Harrington Patent No. 2,823,967.

Each seal 42 is flexible and resilient and is formed of a yieldable polymeric material preferably rubber or a similar material having rubber-like physical qualities. Each seal 42 is initially formed as an annular washer or annulus having a generally flat form in its unstressed condition.

The inner periphery of each seal 42 is stretched to an enlarged diameter and fitted into a coacting annular notch 44 cut into the inner race member 12. As shown in FIGS. 2 and 5, the notches 44 for the respective seals 42 are located on opposite sites of the inner race 14 and are spaced axially inward of the two ledges 38 on the outer race element 20.

From its inner marginal edge which is supported within the coacting groove 44, each seal 42 extends axially away from the balls 18 and radially away from the inner bearing member 12 toward the annular ledges 38 on the outer race elements 20.

Thus, the inner surface 46 of each seal 42 confronts the internal lubricant space 40 and is subject to the pressure of fluid within the lubricant space. It may be noted that a lubricant fitting 48 is provided on one of the outer race elements 20 for injecting lubricant under pressure into the lubricant space 40. Because of the oblique position which each seal 42 has with reference to the axis of the bearing, the pressure of lubricant within the space 40 exerts a force on each seal 42 tending to move the seal axially outward as well as radially inward, with the consequence that an excessive fluid pressure within the space 40, such as might be produced by injection of excessive lubricant into the space 40, can have a tendency to move the seal axially outward, dislodging it from its support groove 44 to possibly result in damage to the bearing.

The seals 42 are protected against dislodgement or damage by elevated fluid pressure in the lubricant space 40 by means of two annular shields 48 supported by the two ledges 38 in coacting relation to the projecting marginal edges of the respective seals 42, as shown in FIG. 2.

In the preferred construction illustrated, each of the shields 48 has a right-angled Z-shape in transverse section. A generally cylindrical medial portion 50 of each shield is dimensioned diametrically to fit within and bear against the inner edge surface of the adjacent outer race element flange 36, as shown in FIG. 5. An annular lip 52 projects radially outward from the inner end of the cylindrical portion 50 of each shield 48 to abut against the adjacent ledge 38 to support the shield against axially outward displacement.

An annular abutment leg 54 on each shield 47 projects radially inward from the axially outer end of the cylindrical segment 50 of the shield into closely spaced relation to the inner race member 12, as shown in FIGS. 2, 4 and 5.

The radially inward surface of the cylindrical segment or portion 50 of each shield 48 defines a cylindrical slide or seal surface 58 which is normally engaged slidably by the projecting outer marginal edge of the adjacent seal 42, as illustrated in FIG. 2. The tendency of each seal 42 to seek its initially flat shape, together with the radial constraining action of the coacting surface 58 on the projecting edge of the seal, causes the projecting marginal edge of the seal to assume a somewhat cylindrical shape in slidable engagement with the coacting surface 58, as shown in FIG. 2.

The extreme projecting edge of each seal 42 terminates in close proximity to a generally flat abutment surface 60 defined by the substantially radial abutment leg 54 of the coacting shield 48. The inner edge of the abutment leg 54 of each shield 48 stops short of the inner race member 12, leaving between the abutment leg and the race member 12 an annular clearance space 62, FIG. 5, having a radial dimension less than the thickness of the seal.

The narrow annular gap 62 between each shield abutment 54 and the inner race member 12 not only provides a running clearance between the seal shield and the member 12, but also provides an avenue of escape for any foreign material which may gain entrance into the unsealed space 64 encircled by the shield and lying outside of the adjacent seal 42.

The annular abutment surface 60 of each shield 48 serves to slidably engage the outer edge surface of the coacting seal 42 to restrain the seal against outward displacement by the pressure of fluid within the lubricant space 40, thus protecting the seal against dislodgement by elevated fluid pressure within the lubricant space. While elevated fluid pressure within the space 40 may cause the projecting portion of each seal 42 to be displaced radially inward, the seal cannot escape through the gap 62 at the inner edge of the coacting shield, since the width of the gap is less than the thickness of the seal.

Moreover, provision is made for relieving excessive fluid pressure within the lubricant space 40, while at the same time maintaining the constraint on each of the seals 42 against outward dispalcement. For this purpose, a plurality (in this instance 3) of fluid discharge ports or notches 70 are formed in the abutment leg 54 of each shield 48. Each notch 70 extends from the extreme inner edge of the associated abutment leg 54 radially outward to an outer extremity of the notch which is spaced radially inward somewhat from the cylindrical portion 50 of the shield, as shown in FIG. 5.

In the event that an excessive volume of lubricant is injected into the lubricant space 40, the projecting portions of the two seals 42 are moved radially inward from their normal positions, as indicated by the shield shown in solid lines in FIG. 5, thereby uncovering the ports or notches 70 to allow the excess lubricant to escape through the ports or notches 70, as indicated by the number 72 in FIG. 5. This automatic release of fluid prevents an excessive buildup in pressure in the space 40, thereby avoiding excessive strain on either the seals 42 or the shields 48 which retain the seals in place.

A modified form of the seal shield used in the bearing is illustrated in FIGS. 6 and 7 in which component elements similar to those of the structure previously described are identified with the same reference numbers with the addition of the suffix "a." As illustrated, the modified shield 48a is radially slit in one place to provide a radial gap 80 in the shield through which excess lubricant in the lubricant space is allowed to escape. The notches or escape ports 70 previously described in relation to the shields 48 of FIGS. 1 to 5 are eliminated from the abutment leg 54a of the modified shield 48a.

The modified shields 48a are preferably formed in a manner such that the shields tend to expand diametrically into firm engagement with the outer race flanges 63a.

The shields 48 of FIGS. 1 to 5 or 48a of FIGS. 6 and 7 not only protect the seals 42 or 42a against dislodgment by internal fluid pressure, but also protect the seals from stringy materials which may be wound into close proximity to the bearing by the rotary motion of structure journalled by the bearing. An example of such stringy materials is parts of plants, such as vines or grass, which may be wound close to the bearing when it is used on agricultural machinery. The seals used in some prior bearings have been subject to being pulled out by stringy materials wound into close proximity to the bearing. The function of the shields in protecting the seals from engagement with such stringy material enhances the dependability and usefulness of the bearing in many applications such as on agricultural machinery.

It will be appreciated that the invention is not necessarily limited to use of the particular construction illustrated, but includes the use of alternatives and equivalents within the spirit and scope of the invention as defined by the claims.

The invention is claimed as follows:

1. A sealed antifriction bearing comprising, in combination, a first race element defining an inner bearing race, a second race element defining an outer bearing race encircling said inner bearing race, a series of antifriction elements disposed between said races and collectively journalling said race elements with respect to each other, means on one of said race elements defining two annular ledges located on opposite sides of said series of antifriction elements and confronting the other of said race elements in spaced relation thereto, said first and second race elements defining therebetween a lubricant space located between said ledges, two annular shields each having a generally right-angled Z-shape in transverse section and being disposed in adjacent relation to said respective ledges, each of said shields defining a generally flat annular anchoring lip extending radially into radially overlapping relation to the adjacent ledge to hold the shield against axially outwardly displacement, each of said shields having a generally cylindrical medial portion defining an inner generally cylindrical seal surface extending axially outward with respect to said anchor lip of the shield, each shield including a generally flat annular abutment extending radially from the axially outer end of the seal surface on the shield into closely adjacent relation to said other race element, two annular seals of yieldable polymeric material disposed in opposite sides of said series of antifriction elements and being supported on said other race element axially inward of said respective shield abutments, each of said seals including a flexible sealing portion extending axially outward and extending radially into slidable engagement with the seal surface on the adjacent shield to form a sliding seal therewith and to be confined against axially outward displacement by said annular abutment on the shield, said sealing portion of each seal being movable away from the adjacent seal surface by fluid pressure within said lubricant space, and each of said shield abutments defining a fluid escape opening therein positioned to be covered with respect to said lubricant space when the sealing portion of the adjacent seal is in engagement with the adjacent seal surface and to be uncovered for discharging fluid from said lubricant space when the seal portion of the adjacent seal is displaced away from the coacting seal surface by fluid pressure within said lubricant space.

2. A sealed antifriction bearing comprising, in combination, an inner race element defining an inner bearing race, an outer race element defining an outer bearing race encircling said inner bearing race, a series of antifriction elements disposed between said races and collectively journalling said race elements with respect to each other, means on said outer race element defining two generally cylindrical seal surfaces disposed on opposite sides of said series of antifriction elements in axially spaced relation to said antifriction elements and facing radially inward toward said inner race element, two initially flat annular seals disposed on opposite sides of said series of antifriction elements, said seals being formed of yieldable polymeric material and having the inner peripheries thereof stretched to fit tightly around said inner race element axially inward of said respective seal surfaces, the outer peripheries of said seals projecting axially outward and extending radially away from said inner race element into slidable sealing engagement with said respective seal surfaces, means on said outer race element defining two annular abutments extending radially inward from the axially outer ends of said respective seal surfaces into radially overlapping relation to the outer peripheries of said respective seals, each of said annular abutments having a spacing from said inner race element which is less than the thickness of the adjacent seal, said first and second race elements including means defining lubricant space adjacent said antifriction elements and located axially between said seal surfaces, means on one of said race elements for directing lubricant into said lubricant space, and said outer race element and said means thereon including means defining a fluid escape opening from said lubricant space located radially outward of the inner extremities of said annular abutments.

3. A sealed antifriction bearing comprising, in combination, a first race element defining an inner bearing race, a second race element defining an outer bearing race encircling said inner bearing race, a series of antifriction elements disposed between said races and collectively journalling said race elements with respect to each other, means on said outer race defining two annular ledges located on opposite sides of said series of antifriction elements in confronting relation to said first race element to serve in cooperation with said inner and outer races to define a space for lubricant, two annular shields supported on said respective ledges in close contact therewith, each of said shields defining a generally cylindrical seal surface and including an annular abutment extending radially inward from the axially outward end of said seal surface on the shield, two flexible annular seals disposed on opposite sides of said series of antifriction elements and being supported on said first race element in positions thereon disposed axially inward of said respective shield abutments, each of said seals including a flexible annular sealing portion projecting axially outward and radially away from said first race element into slidable sealing engagement with said seal surface of the adjacent shield, a lubricant fitting on said first race element for supplying lubricant to said lubricant space, said projecting portions of each of said seals being movable in a radially inward direction away from the coacting seal surfaces on said shields under the influence of fluid pressure in said lubricant space, and each of said shield abutments defining a fluid escape opening therein positioned to discharge fluid from said lubricant space upon inward movement of said sealing portion of the adjacent seal by fluid pressure within said space.

4. A sealed antifriction bearing comprising, in combination, a first race element defining an inner bearing race, a second race element defining an outer bearing race encircling said inner bearing race, a series of antifriction elements disposed between said races and collectively journalling said race elements with respect to each other, means on one of said race elements defining two annular seal surfaces disposed on opposite sides of said series of antifriction elements and confronting the other of said race elements, means on said one race element defining two annular abutments extending in a generally radial direction toward said other race element from the axially outer ends of said respective seal surfaces, two flexible annular seals disposed on opposite sides of said series of antifriction elements and being supported on said other race element in positions thereon disposed axially inward of said respective abutments, each of said seals including a flexible annular portion projecting axially outward and extending radially away from said other race element into slidable sealing engagement with the adjacent seal surface on said one race element so that said annular portion of each seal when engaged with its coacting seal surface is radially overlapped by the adjacent one of said annular abutments, each of said annular abutments having a spacing from said other race element which is less than the thickness of the adjacent seal, said first and second race elements including means defining lubricant space adjacent said antifriction elements and located axially between said seal surfaces, means on one of said race elements for directing lubricant into said lubricant space, said annular portion of each seal being movable away from the coacting seal surface by fluid pressure within said lubricant space, and each of said annular abutments defining a fluid escape opening positioned to be covered with respect to said lubricant space when said annular portion of the adjacent seal is in engagement with the adjacent seal surface and to be uncovered for discharging fluid from said lubricant space when said annular portion of the adjacent seal is displaced away from the adjacent seal surface by fluid pressure in said lubricant space.

5. A sealed bearing comprising, in combination, an inner bearing element, an outer bearing element encircling said inner bearing element, said inner and outer bearing elements being journalled together for relative rotation about a common axis by journal means formed at least in part by the inner and outer bearing elements, means on said outer bearing element defining an annular seal surface located on one side of said journal means in concentric relation to said common axis and facing generally in a radially inward direction, means on said outer bearing element defining an annular abutment extending generally in a radially inward direction from the circumferential edge of said seal surface which is more remote axially from said journal means, a flexible annular seal formed of yieldable polymeric material and supported nonrotatably on said inner bearing element in a position thereon which is located on the journal means side of said annular abutment in axially spaced relation to said annular abutment; said seal including a flexible annular portion which, as viewed in axial section, cantilevers from said inner bearing element in a direction extending axially away from said journal means; said cantilevering annular portion of said seal having an axially extending marginal edge which seeks a sealing position in which said marginal edge extends axially along said seal surface in slidable engagement therewith and in which said marginal edge is radially overlapped by said annular abutment to be restrained by the latter against radially outward displacement, and said inner bearing element being shaped and dimensioned in relation to said seal surface and said seal to provide when the seal is in engagement with said seal surface a radial clearance space of annular form extending axially along the full axial extent of said seal which engages said seal surface and being disposed along the radially inward side of said axially extending marginal edge of the seal to provide for movement of said marginal edge of the seal radially inward from said seal surface.

6. A sealed bearing comprising, in combination, an inner bearing element, an outer bearing element encircling said inner bearing element, said inner and outer bearing elements being journalled together for relative rotation about a common axis by journal means formed at least in part by the inner and outer bearing elements, means on said outer bearing element defining two annular seal surfaces located on opposite sides of said journal means in concentric relation to said common axis and facing in a generally radially inward direction, means on said outer bearing element defining two annular abutments extending generally in radially inward directions from the circumferential edges of said respective seal surfaces which are more remote axially from said journal means, two flexible annular seals formed of yieldable polymeric material and supported nonrotatably on said inner bearing element in positions thereon which are disposed respectively axially inward of said respective seal surfaces with reference to said journal means; each of said seals including a flexible annular portion which, as viewed in axial section, cantilevers axially outward with respect to said journal means and extends radially away from said inner bearing element into slidable sealing engagement with the adjacent seal surface on said outer bearing element so that said cantilevering annular portion of each seal when engaged with its coacting seal surface is radially overlapped by the adjacent one of said annular abutments; and each of said annular abutments having a minimum spacing from said inner bearing element which is less than the thickness of the adjacent seal.

7. A sealed bearing comprising, in combination, a first bearing element, a second bearing element encircling said first bearing element, said first and second bearing elements being journalled together for relative rotation about a common axis by journal means formed at least in part by said first and second bearing elements, means on one of said bearing elements defining an annular seal surface located on one side of said journal means in concentric relation to said common axis and facing generally in a radial direction toward said other bearing element, means on said one bearing element defining an annular abutment extending generally in a radial direction toward said other bearing element from the circumferential edge of said seal surface which is more remote axially from said journal means, a flexible annular seal formed of yieldable polymeric material and supported nonrotatably on said other bearing element in a position thereon which is located on the journal means side of said annular abutment in axially spaced relation to said annular abutment; said seal including a flexible annular portion which, as viewed in axial section, cantilevers from said other bearing element in a direction extending axially away from said journal means; said cantilevering annular portion of said seal having an axially extending marginal edge which seeks a sealing position in which said marginal edge extends axially along said seal surface in slidable engagement therewith and in which said marginal edge is radially overlapped by said annular abutment to be restrained by the latter against axial displacement away from said journal means, and said other bearing element being shaped and dimensioned in relation to said seal surface and said seal to provide when the seal is in engagement with said seal surface a radial clearance space of annular form extending axially along the full axial extent of said seal which engages said seal surface and being disposed on the side of said axially extending marginal edge remote from said seal surface to provide for movement of said marginal edge of the seal radially away from said seal surface.

8. A sealed bearing comprising, in combination, a first bearing element, a second bearing element encircling said first bearing element, said first and second bearing elements being journalled together for relative rotation about a common axis by journal means formed at least in part by said first and second bearing elements, means on one of said bearing elements defining an annular seal surface located on one side of said journal means in concentric relation to said common axis and facing generally in a radial direction toward said other bearing element, means on said one bearing element defining an annular abutment extending generally in a radial direction toward said other bearing element from the circumferential edge of said seal surface which is more remote axially from said journal means, a flexible annular seal formed of yieldable polymeric material and supported nonrotatably on said other bearing element in a position thereon which is located on the journal means side of said annular abutment in axially spaced relation to said annular abutment; said seal including a flexible annular portion which, as viewed in axial section, cantilevers from said other bearing element in a direction extending axially away from said journal means; said cantilevering annular portion of said seal having an axially extending marginal edge which seeks a sealing position in which said marginal edge extends axially along said seal surface in slidable engagement therewith and in which said marginal edge is radially overlapped by said annular abutment to be restrained by the latter against axial displacement away from said journal means, said other bearing element being shaped and dimensioned in relation to said seal surface and said seal to provide when the seal is in engagement with said seal surface a radial clearance space of annular form extending axially along the full axial extent of said seal which engages said seal surface and being disposed on the side of said axially extending marginal edge remote from said seal surface to provide for movement of said marginal edge of the seal radially away from said seal surface, said bearing elements being shaped in relation to each other to define a lubricant space on the journal means side of said seal, means on one of said bearing elements for directing lubricant into said lubricant space, and said annular abutment defining a fluid escape opening positioned to be covered with respect to said lubricant space when said marginal edge of said seal is in engagement with said seal surface and to be uncovered for discharging fluid from said lubricant space when said marginal edge of the seal is displaced away from said seal surface by fluid pressure in said lubricant space.

References Cited in the file of this patent
UNITED STATES PATENTS

| | | |
|---|---|---|
| 2,621,091 | Hickling | Dec. 9, 1952 |
| 2,653,064 | Heim | Sept. 22, 1953 |
| 2,686,088 | Nelson | Aug. 10, 1954 |
| 2,823,967 | Harrington | Feb. 18, 1958 |